US012777111B2

(12) United States Patent
Kim et al.

(10) Patent No.: US 12,777,111 B2
(45) Date of Patent: Oct. 27, 2026

(54) DISPLAY DEVICE

(71) Applicant: Samsung Display Co., LTD., Yongin-si (KR)

(72) Inventors: Hun-Tae Kim, Yongin-si (KR); Jae-Yong Kwon, Yongin-si (KR); Sang Hyeok Kim, Yongin-si (KR); Jae Chun Park, Yongin-si (KR); Dong-Hun Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 761 days.

(21) Appl. No.: 18/312,026

(22) Filed: May 4, 2023

(65) Prior Publication Data

US 2024/0064221 A1 Feb. 22, 2024

(30) Foreign Application Priority Data

Aug. 22, 2022 (KR) ........................ 10-2022-0105040

(51) Int. Cl.

*H01L 51/00* (2006.01)
*G06F 1/16* (2006.01)
*H04M 1/02* (2006.01)

(52) U.S. Cl.

CPC ........ *H04M 1/0277* (2013.01); *G06F 1/1616* (2013.01); *G06F 1/1652* (2013.01); *G06F 1/1656* (2013.01); *H04M 1/0216* (2013.01); *H04M 1/0268* (2013.01)

(58) Field of Classification Search

None

See application file for complete search history.

(56) References Cited

U.S. PATENT DOCUMENTS

2016/0338219 A1* 11/2016 Seo ................... G02F 1/133308
2019/0081274 A1* 3/2019 Choi .................... H10K 59/122
2020/0020759 A1* 1/2020 Song ....................... G06F 3/041

FOREIGN PATENT DOCUMENTS

| | | |
|---|---|---|
| JP | 2017-121777 | 7/2017 |
| KR | 10-0609871 | 8/2006 |
| KR | 10-2019-0081537 | 7/2019 |
| KR | 10-2022-0026565 | 3/2022 |

* cited by examiner

*Primary Examiner* — Anthony J Frost

(74) *Attorney, Agent, or Firm* — Sughrue Mion, PLLC

(57) ABSTRACT

A display device according to an embodiment includes: a display panel; a first flexible printed circuit board electrically connected to the display panel; and a protective film attached to the first flexible printed circuit board, wherein the protective film includes: a cover layer; a support layer disposed between the cover layer and the first flexible printed circuit board; a first adhesive layer attaching the cover layer and the support layer; and a second adhesive layer attaching the support layer to the first flexible printed circuit board and including a first adhesive portion and a second adhesive portion having different adhesive forces.

20 Claims, 11 Drawing Sheets

DISPLAY DEVICE

CROSS-REFERENCE TO RELATED APPLICATION

This application claims priority to and the benefit of Korean Patent Application No. 10-2022-0105040 under 35 U.S.C. § 119, filed in the Korean Intellectual Property Office on Aug. 22, 2022, the entire contents of which are incorporated herein by reference.

BACKGROUND

1. Technical Field

This disclosure relates to a display device including a flexible printed circuit board (FPCB).

2. Description of the Related Art

Electronic devices such as smartphones, mobile phones, tablets, multimedia players, televisions, and monitors include display devices for displaying images. Each of the display devices includes a display panel that implements a screen displaying an image. A flexible display device capable of deformation such as bending, folding, rolling, and stretching by using a flexible substrate as a substrate for a display panel has been developed.

An electronic device (e.g., a smart phone) including a flexible display device may be implemented to be folded and unfolded like a book. Such an electronic device has an advantage of being able to be folded and compactly carried, and when used, it may be unfolded to enjoy a wide screen.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

A display device may include a flexible printed circuit board that is extended to a display panel and transfers signals to the display panel. The flexible printed circuit board may include a wire region in which a wire is positioned and a component region in which components are positioned. In an electronic device including a bending portion (or a folding portion), it may be advantageous to form a wide wire region without the flexible printed circuit board encroaching on the bending portion as much as possible. Reducing the thickness of the flexible printed circuit board also may be advantageous for the electronic device to accommodate a high-capacity battery. In case that the wire region of the flexible printed circuit board is wide and thin, the flexible printed circuit board may be curled.

Embodiments provide a display device including a protective film capable of preventing curling of a flexible printed circuit board. Embodiments also may provide a display device including a protective film that can be prevented from lifting and that can be easily removed.

A display device according to an embodiment includes: a display panel; a first flexible printed circuit board electrically connected to the display panel; and a protective film attached to the first flexible printed circuit board. The protective film includes: a cover layer; a support layer disposed between the cover layer and the first flexible printed circuit board; a first adhesive layer attaching the cover layer and the support layer; and a second adhesive layer attaching the support layer to the first flexible printed circuit board and including a first adhesive portion and a second adhesive portion, the first and second adhesive portions having different respective adhesive forces.

The adhesive force of the first adhesive portion may be greater than the corresponding adhesive force of the second adhesive portion, and the second adhesive portion may have a larger area than a corresponding area of the first adhesive portion.

The first adhesive portion may extend in a diagonal direction with respect to a peeling direction of the protective film.

The first adhesive portion may be disposed closer to a position, where peeling of the protective film starts, than the second adhesive portion.

The adhesive force of the first adhesive portion may be about 350 gf/25 mm to about 450 gf/25 mm, and the adhesive force of the second adhesive portion may be about 150 gf/25 mm to about 250 gf/25 mm.

The adhesive force of the first adhesive layer may be about 2500 gf/25 mm or more.

The first flexible printed circuit board may include: a compression portion bonded to the display panel; a bending portion that is bent while surrounding an edge of the display panel; and a body including a wire region in which a wire is disposed and a component region in which a component is disposed. The support layer may be attached to the wire region.

The protective film may not cover the component region.

The support layer, the first adhesive layer, and the second adhesive layer may have a same planar shape. The cover layer may completely cover the support layer.

The display device may further include a second flexible printed circuit board electrically connected to the first flexible printed circuit board. The protective film may be attached to the second flexible printed circuit board.

An adhesive force of a portion of the second adhesive layer attaching the support layer to the second flexible printed circuit board may be about 350 gf/25 mm to about 450 gf/25 mm.

The cover layer may include a portion that does not overlap the first flexible printed circuit board and the second flexible printed circuit board in a plan view. The support layer may not include a portion that does not overlap the first flexible printed circuit board and the second flexible printed circuit board in a plan view.

The display panel may include a first flat area, a second flat area, and a bending area between the first flat area and the second flat area. The first flexible printed circuit board may not be disposed on a rear surface of the first flat area.

At least one of the cover layer and the support layer may be a single-layer film including polyethylene terephthalate.

A display device according to an embodiment includes: a display panel; a first flexible printed circuit board electrically connected to the display panel; a second flexible printed circuit board electrically connected to the first flexible printed circuit board; and a protective film attached to the first flexible printed circuit board and the second flexible printed circuit board. The protective film includes: a cover layer defining a planar shape of the protective film; a support layer disposed between the cover layer and the first flexible printed circuit board, and further disposed between the cover layer and the second flexible printed circuit board; a first adhesive layer attaching the cover layer and the support layer; and a second adhesive layer attaching the support layer to the first flexible printed circuit board and the second flexible printed circuit board and including first and second adhesive portions, the first and second adhesive portions having different respective adhesive forces.

The adhesive force of the first adhesive portion may be greater than the corresponding adhesive force of the second adhesive portion, and the second adhesive portion may have a larger area than a corresponding area of the first adhesive portion.

The first adhesive portion may extend in a diagonal direction with respect to a peeling direction of the protective film.

The adhesive force of the first adhesive portion may be about 350 gf/25 mm to about 450 gf/25 mm, and the adhesive force of the second adhesive portion may be about 150 gf/25 mm to about 250 gf/25 mm.

The first flexible printed circuit board may include: a compression portion bonded to the display panel; a bending portion that is bent while surrounding an edge of the display panel; and a body including a wire region in which a wire is disposed and a component region in which a component is disposed. The support layer may be attached to the wire region.

The support layer, the first adhesive layer, and the second adhesive layer may have a same planar shape. The cover layer may completely cover the support layer.

According to the embodiments, it is possible to provide a display device including a protective film capable of preventing curling of a flexible printed circuit board. It is also possible, according to the embodiments, to provide a display device including a protective film that can be prevented from lifting and can be easily removed. Further, according to the embodiments, there are other advantageous effects that can be recognized throughout the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
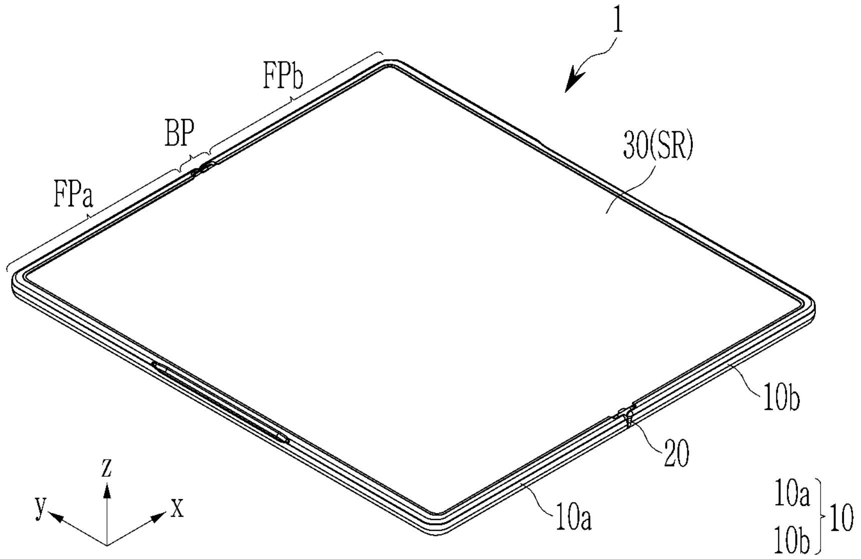
FIG. 1 illustrates a perspective view showing an unfolded state of an electronic device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Sizes and thicknesses of constituent elements shown in the accompanying drawings are arbitrarily given for better understanding and ease of description. In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

When an element is described as "not overlapping" or "to not overlap" another element, this may include that the elements are spaced apart from each other, offset from each other, or set aside from each other or any other suitable term as would be appreciated and understood by those of ordinary skill in the art.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween. In contrast, when an element is referred to as being "directly on" another element, there are no intervening elements present.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The term "connected" in the specification means that two or more components are not only directly connected, but two or more components may be connected indirectly through other components, physically connected as well as being electrically connected, or it may be referred to be different names depending on the location or function, but may include connecting each of parts that are substantially integral to each other.

In the drawings, signs "x", "y", and "z" are used to indicate directions, wherein x is used for indicating a first direction, y is used for indicating a second direction that is perpendicular to the first direction, and z is used for indicating a third direction that is perpendicular to the first direction and the second direction.

Figure 2:
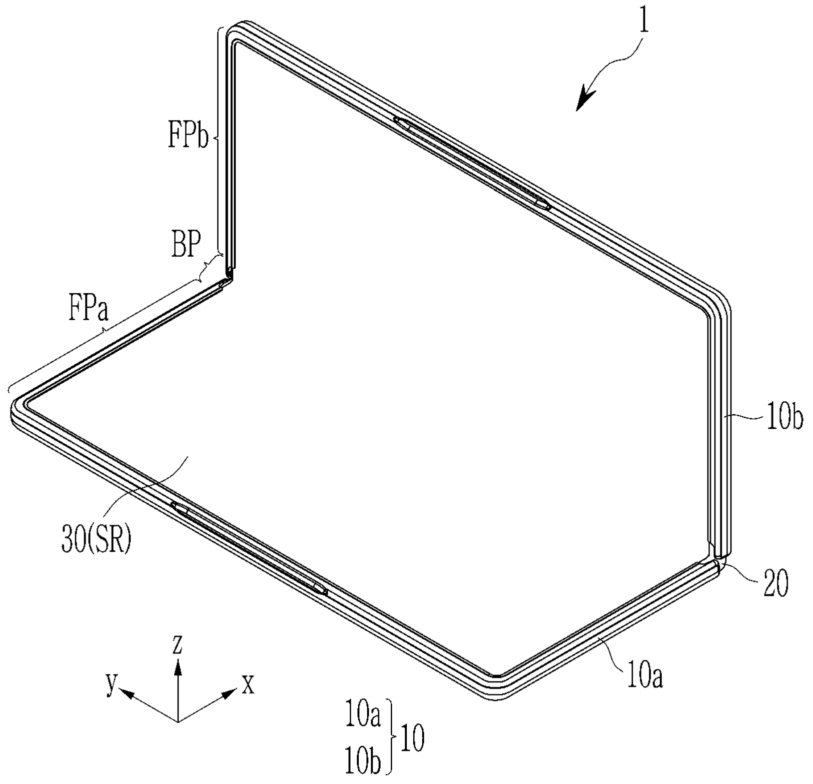
FIG. 2 illustrates a perspective view showing a partially unfolded state of an electronic device according to an embodiment.
Figure 3:
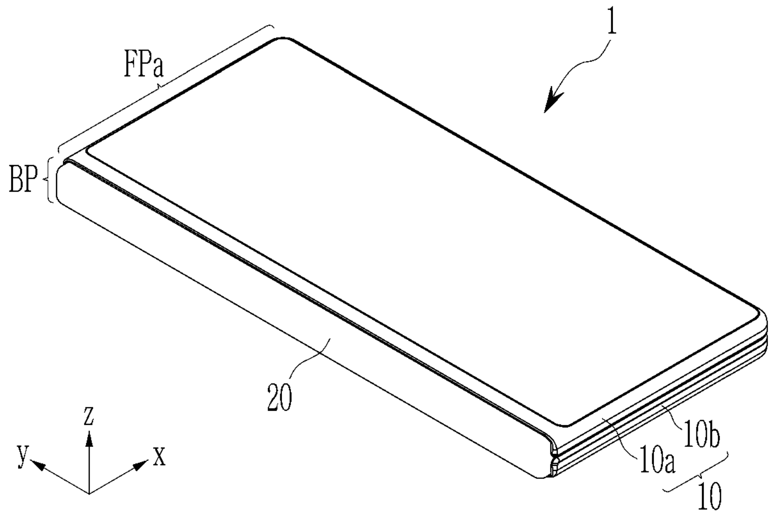
FIG. 3 illustrates a perspective view showing a folded state of an electronic device according to an embodiment.

FIG. 1 illustrates a perspective view showing an unfolded state of an electronic device according to an embodiment, FIG. 2 illustrates a perspective view showing a partially unfolded state of an electronic device according to an embodiment, and FIG. 3 illustrates a perspective view showing a folded state of an electronic device according to an embodiment.

The electronic device 1 may be a device configured to display an image, such as a smart phone, a mobile phone, a tablet, a multimedia player, a game machine, a monitor, and the like. The electronic device 1 may be a foldable electronic device. For example, the electronic device 1 may be a foldable smartphone. The electronic device 1 may be fully unfolded flat as illustrated in FIG. 1, partially folded as illustrated in FIG. 2, and fully folded as illustrated in FIG. 3. A description that a component is "configured to" perform a specified operation may be defined as a case where the component is constructed and arranged with structural features that can cause the component to perform the specified operation.

The electronic device 1 includes a first flat portion FPa, a second flat portion FPb, and a bending portion BP between the first flat portion FPa and the second flat portion FPb. The bending portion BP may be a portion that is bent in case that the electronic device 1 is folded, and the first flat portion FPa and the second flat portion FPb may be portions that are not bent. The bending portion BP may be bent around an axis that is parallel to a second direction y. The bending portion BP may be referred to as a folding portion.

Although one bending portion 13 is illustrated, the electronic device 1 may include bending portions 13 that are spaced apart from each other, can be bent with different radii of curvature, or can be bent around different bending axes. Although the bending portion BP is illustrated to be positioned approximately at a center of the electronic device 1, a position and width of the bending portion BP in an entire area of the electronic device 1 may be changed.

The electronic device 1 includes a body 10. The body 10 may be referred to as a set, a set frame, or a housing. The body 10 may form an overall appearance of the electronic device 1, and various components constituting the electronic device 1, such as a processor, a memory, a driving device, a printed circuit board, a battery, a communication module, a speaker, and various sensors, may be accommodated therein. The body 10 may include a first body portion 10*a* corresponding to the first flat portion FPa and a second body portion 10*b* corresponding to the second flat portion FPb. The first body portion 10*a* and the second body portion 10*b* may form a pair with each other.

The electronic device 1 includes a hinge part 20. The hinge part 20 may be extended to the body 10. The hinge part 20 may be extended to the first body portion 10*a* and the second body portion 10*b* to allow the electronic device 1 to be folded and unfolded. In case that the electronic device 1 is unfolded, the first body portion 10*a* and the second body portion 10*b* may be side by side as illustrated in FIG. 1, and in case that the electronic device 1 is folded, the first body portion 10*a* and the second body portion 10*b* may face each other as illustrated in FIG. 3. In case that the electronic device 1 is partially unfolded or folded, the first body portion 10*a* and the second body portion 10*b* may be maintained at an angle as illustrated in FIG. 2. The hinge part 20 may serve as a rotation axis of the bending portion BP, and may allow the bending portion BP to be bent. Accordingly, the electronic device 1 may be generally deformed between folding and unfolding. The electronic device 1 also may be maintained in a partially folded or unfolded state.

The electronic device 1 includes a display device 30 that provides a screen SR on which an image may be displayed. The screen SR may correspond to a display area in which pixels are arranged in the display device 30. The bending portion BP may be positioned across the screen SR in the second direction y. In the display device 30, at least an area corresponding to the bending portion BP may be flexible.

The display device 30 may be attached to the body 10, and as the electronic device 1 is unfolded and folded, the display device 30 may be unfolded and folded.

As illustrated in FIG. 3, the electronic device 1 may be folded such that portions of the screen face each other, i.e., a screen portion of the first flat portion FPa and a screen portion of the second flat portion FPb face each other. In the folded state, the screen portion of the bending portion BP may be covered. In case that the first flat portion FPa and the second flat portion FPb are substantially the same, the entire screen SR may be covered by the body 10 of the electronic device 1 in the folded state.

Figure 4:
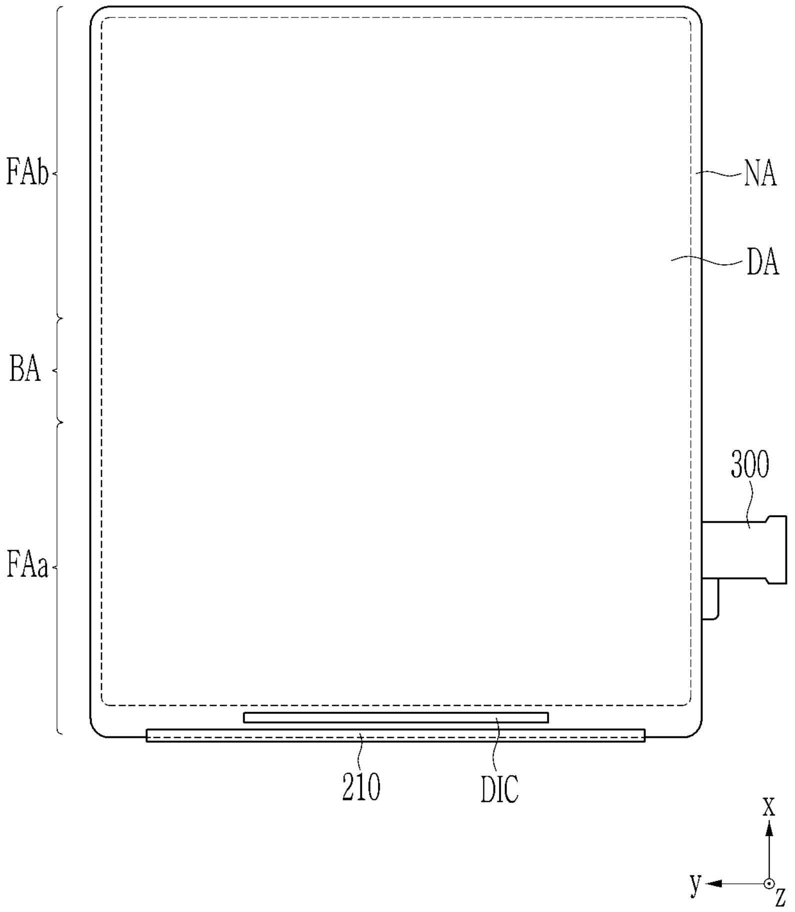
FIG. 4 illustrates a front view of a display device according to an embodiment.
Figure 5:
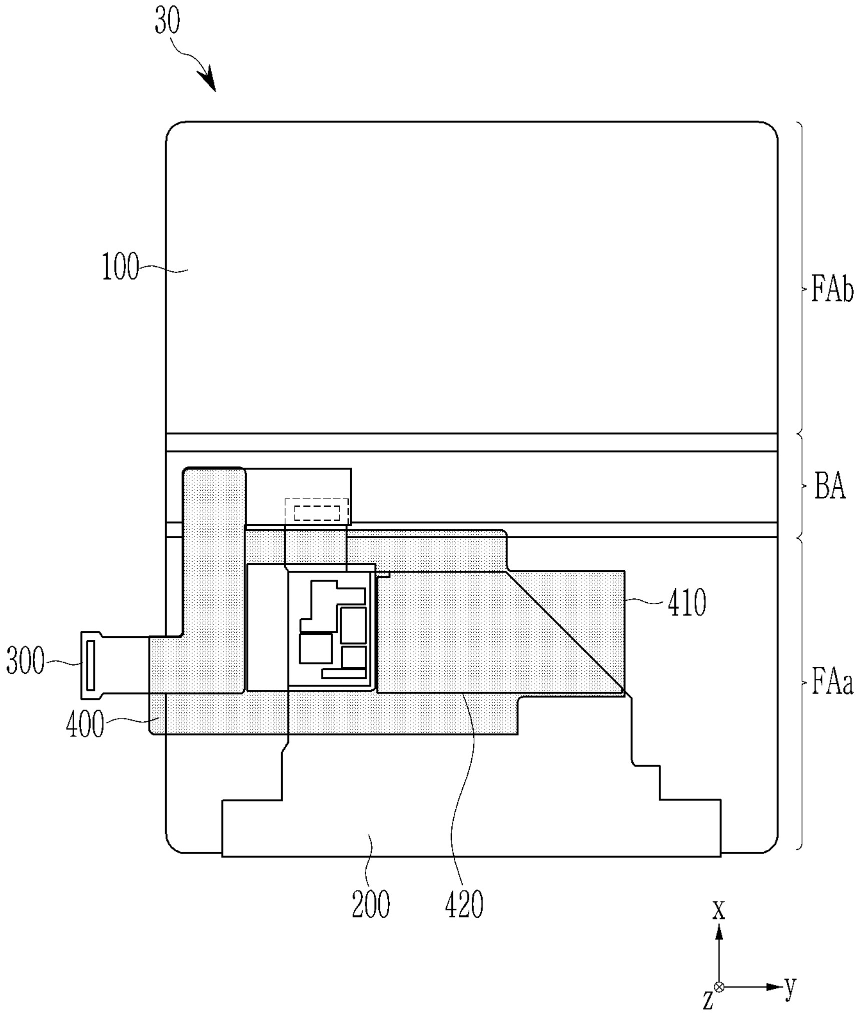
FIG. 5 illustrates a rear view of a display device according to an embodiment.
Figure 6:
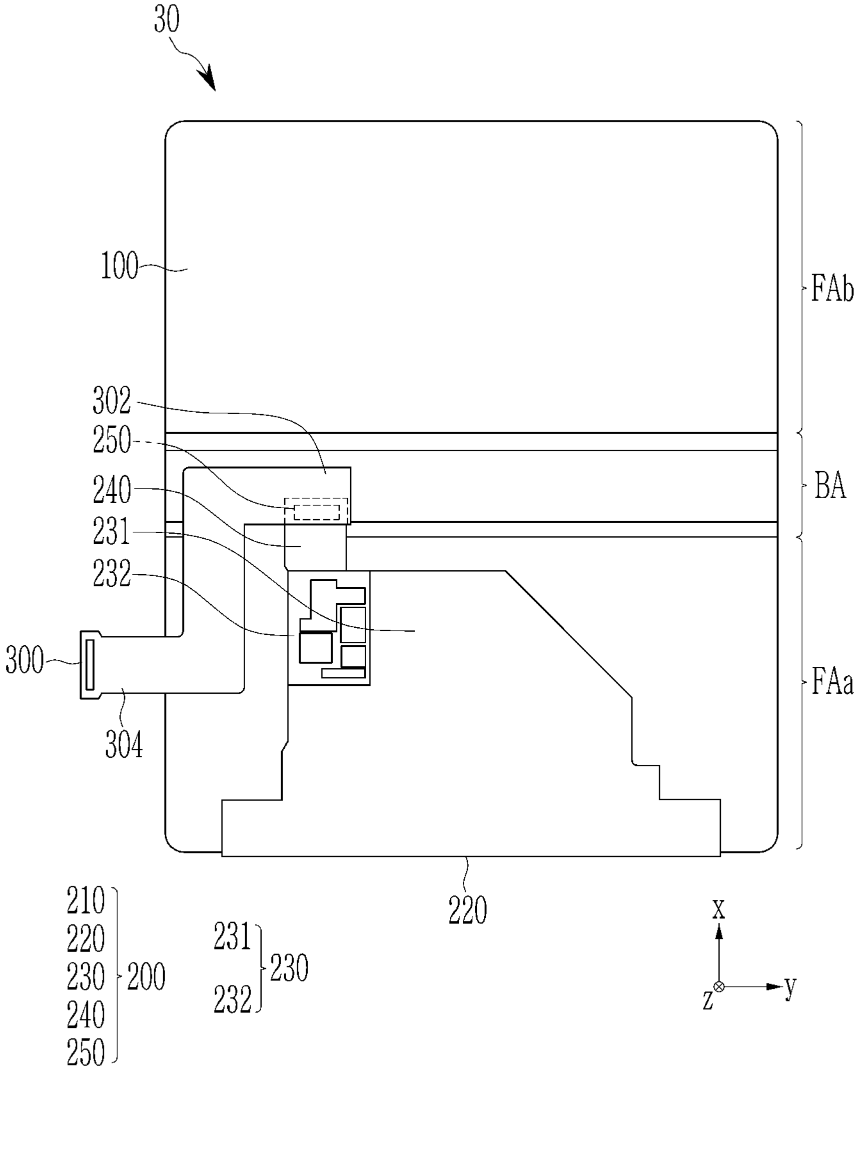
FIG. 6 illustrates a state before a protective film is attached to the display device illustrated in FIG. 5.

FIG. 4 illustrates a front view of a display device according to an embodiment, and FIG. 5 illustrates a rear view of a display device according to an embodiment. FIG. 6 illustrates a state before a protective film is attached to the display device illustrated in FIG. 5.

Referring to FIG. 4, FIG. 5, and FIG. 6, a display device 30 that may be included in the aforementioned electronic device 1 is illustrated. The display device 30 may include a display panel 100, a first flexible printed circuit board 200 (or flexible circuit board 200), a second flexible printed circuit board 300, a protective film 400, and the like.

The display panel 100 may be a light emitting display panel including light emitting diodes or a liquid crystal display panel including a liquid crystal layer, but the display panel 100 is not limited thereto. The display panel 100 includes a first flat area FAa, a second flat area FAa and a bending area BA respectively corresponding to the first flat portion Fpa, the second flat portion Fpb, and the bending portion BP illustrated in FIGS. 1-3. The bending area BA may be bent in case that the bending portion BP is bent. The bending area BA may be referred to as a folding area. The display device 30 and the display panel 100 may respectively be a foldable display device and a foldable display panel, in which the bending area BA may be bent about a bending axis to be folded such that the first flat portion FPa and the second flat portion FPb face each other.

The display panel 100 may include a display area DA corresponding to a screen on which an image may be displayed and a non-display area NA, and circuits and/or signal lines for generating and/or transferring various signals and voltages applied to the display area DA are disposed in the non-display area NA. The non-display area NA may be positioned to surround a periphery of the display area DA. In FIG. 4, inside and outside of a dotted rectangle correspond to the display area DA and the non-display area NA, respectively.

Pixels are positioned to have a matrix form in the display area DA of the display panel 100. Signal lines such as a gate line and a driving voltage line also may be positioned in the display area DA. Each of the pixels may be electrically connected to the gate line, the data line, the driving voltage line, and the like to receive a gate signal, a data voltage, a driving voltage, and the like from these signal lines. The pixel may be implemented as a light-emitting device such as a light emitting diode.

A touch electrode for detecting a contact touch and/or a non-contact touch of a user may be positioned in the display area DA. Accordingly, the display panel 100 may be a touch screen panel capable of sensing a touch in addition to having a function of displaying an image. Although the display area DA having a substantially rectangular shape is illustrated, the display area DA may have various shapes such as a polygonal shape, a circular shape, an elliptical shape, and the like.

A driver may be disposed in the non-display area NA of the display panel 100 to generate and/or process various signals for driving the display panel 100. The driver may include a data driver for applying a data voltage to the data line, a gate driver for applying a gate signal to the gate line, and a signal controller for controlling the data driver and the gate driver. The pixels may receive the data voltage at a timing depending on the gate signal generated by the gate driver. The gate driver may be integrated in the display panel 100, and may be positioned on at least one side of the display area DA (e.g., left and right sides of the display area DA).

The data driver may be provided as a driving integrated circuit (DIC). The driving integrated circuit chip may be mounted in the non-display area NA at a lower end portion of the display panel 100. The driving integrated circuit chip may have a three-dimensional shape of an approximate cuboid shape and an approximate rectangular planar shape. The driving integrated circuit chip may be mounted with a long side that is parallel to the second direction y. The driving integrated circuit chip may be mounted in the first flexible circuit board 200, also referred to herein as a first flexible printed circuit board 200. The signal controller may be provided as an integrated circuit chip (not illustrated), mounted in the first flexible printed circuit board 200, and electrically connected to the display panel 100 through the first flexible printed circuit board 200. The signal controller may be integrated into the driving integrated circuit.

A pad portion (not illustrated) in which pads for receiving signals from the outside of the display panel 100 are arranged may be positioned in the non-display area NA of the display panel 100. The pad portion may be positioned at a lower portion of the display panel 100. The driving integrated circuit chip may be positioned between the display area DA and the pad portion. A first end of the first flexible printed circuit board 200 may be bonded to the pad portion. Pads of the first flexible printed circuit board 200 may be electrically connected to the pads of the pad portion.

The first flexible printed circuit board 200 (also referred to as a “main flexible printed circuit board”) includes a compression portion 210, a bending portion 220, a body 230, a tail 240, and a connector 250. The first flexible printed circuit board 200 may be bent while the bending portion 220 surrounds a lower edge of the display panel 100 that is approximately parallel to the second direction y in a state where the compression portion 210 is bonded to the pad portion. Accordingly, as illustrated in FIG. 6, most of the first flexible printed circuit board 200 (e.g., the body 230, the tail 240, and the connector 250) may be positioned on a rear surface of the display panel 100, and a portion protruding from the display panel 100 may be minimized. The first flexible printed circuit board 200 may be attached to the rear surface of the display panel 100 through an adhesive member in order to maintain a state in which the first flexible printed circuit board 200 is bent. The first flexible printed circuit board 200 may be positioned on a rear surface of the first flat area FAa of the display panel 100, but the first flexible printed circuit board 200 may not be positioned or disposed on a rear surface of the second flat area Fab.

In the first flexible printed circuit board 200, the body 230 may include a wire region 231 and a component region 232. Wires may be positioned in the wire region 231, and components such as an integrated circuit, a capacitor, a resistor, and an inductor may be positioned in the component region 232. A region of the body 230 excluding the component region may be a wire region 231. The tail 240 may extend from the body 230, and the connector 250 may be formed at an end portion of the tail 240.

It may be advantageous to make a thickness of the body 230 that may overlap a battery as thin as possible in order to increase a capacity of the battery while reducing a thickness of the electronic device 1. This is because as the thickness of the body 230 decreases, a thickness of the battery can be increased. For example, the wire region 231 may have four layers, and may have a thickness of about 0.21 mm to about 0.25 mm. The component region 232 may have six layers, and may have a thickness of about 0.24 mm to about 0.3 mm. For example, the thickness of the wire region 231 may be about 0.23 mm, and the thickness of the component region 232 may be about 0.28 mm. In case that a thickness of the body 230 is thin, layers of the body 230 are inevitably limited, and thus it is necessary to increase an area of the wire region 231 in order to secure an area in which wires can be arranged. In the electronic device 1 including the bending portion BP, it may be advantageous to form the component region 232 in the body portion 230 to be biased to one side in order to secure the wire region 231 as wide as possible while the first flexible printed circuit board 200 does not invade the bending portion BP. Accordingly, the wire region 231 may be formed to have a small thickness, and the wire region 231 may be wound or rolled.

The second flexible printed circuit board 300 (also referred to as a "bridge flexible printed circuit board") may be electrically connected to the connector 250 of the first flexible printed circuit board 200. The second flexible printed circuit board 300 may have a first end 302 electrically connected to the connector 250 and a second end 304 positioned outside the display panel 100. In the second flexible printed circuit board 300, a remaining region except for connectors of the first end and the second end may be a wire region in which wires are positioned. The second flexible printed circuit board 300 may also have a relatively thin thickness. For example, the wire region of the second flexible printed circuit board 300 may have two layers, and may have a thickness of about 0.08 mm to about 0.12 mm. The second flexible printed circuit board 300 may be used to input signals for testing the display device 30 to the display device 30 in case that the electronic device 1 is manufactured. The second flexible printed circuit board 300 may be separated from the first flexible printed circuit board 200 after the display device 30 is inspected.

The protective film 400 may be attached to the first flexible printed circuit board 200 and the second flexible printed circuit board 300. The protective film 400 may support the first flexible printed circuit board 200 and the second flexible printed circuit board 300 each of which has a thin thickness, thereby preventing bending or winding of the first flexible printed circuit board 200 and the second flexible printed circuit board 300. The protective film 400 also may prevent the first flexible printed circuit board 200 and the second flexible printed circuit board 300 from being damaged by exposure to an external environment in the process of transporting and assembling the display device 30. The protective film 400 may cover a portion of the first flexible printed circuit board 200 and a portion of the second flexible printed circuit board 300. The protective film 400 may have a portion that does not cover the first flexible printed circuit board 200 and the second flexible printed circuit board 300. The protective film 400 may not cover the component region 232. The protective film 400 may include a portion that is not attached to the first flexible printed circuit board 200 while covering the first flexible printed circuit board 200. The protective film 400 may be finally removed. For example, after the display device 30 is mounted in the body 10 of the electronic device 1, the protective film 400 may be removed.

Figure 7:
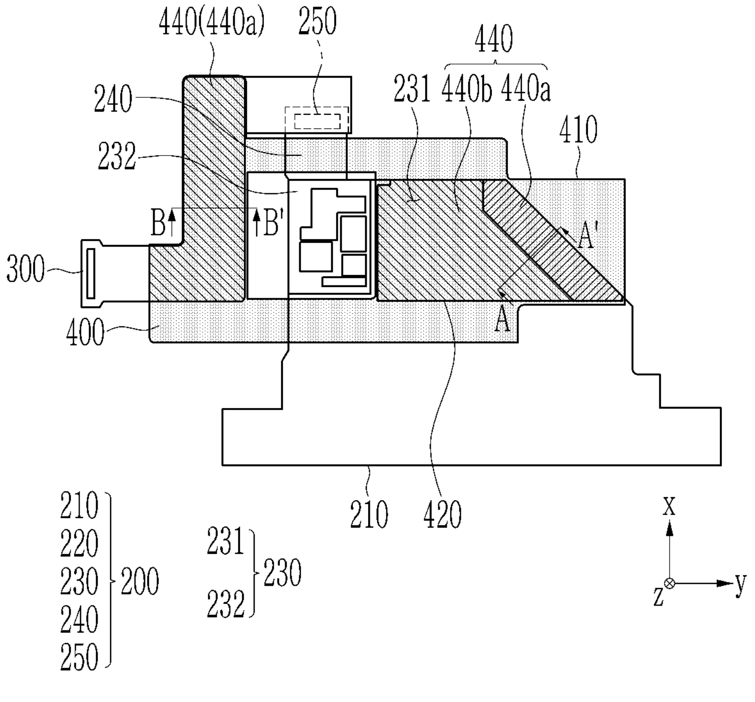
FIG. 7 illustrates a state in which a flexible printed circuit board and a protective film are separated from the display device illustrated in FIG. 5.
Figure 8:
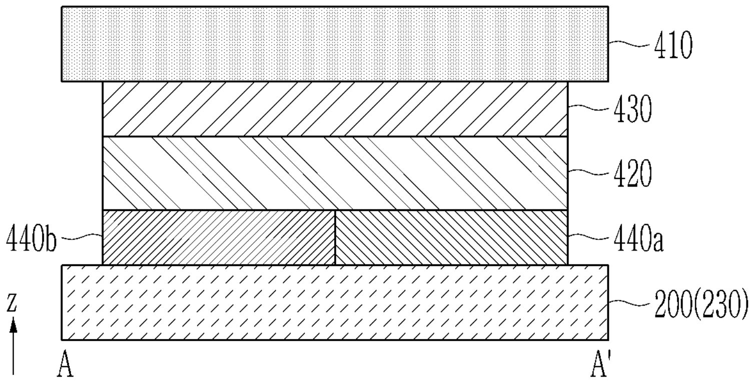
FIG. 8 illustrates a schematic view showing a cross-section taken along line A-A' in FIG. 7.
Figure 9:
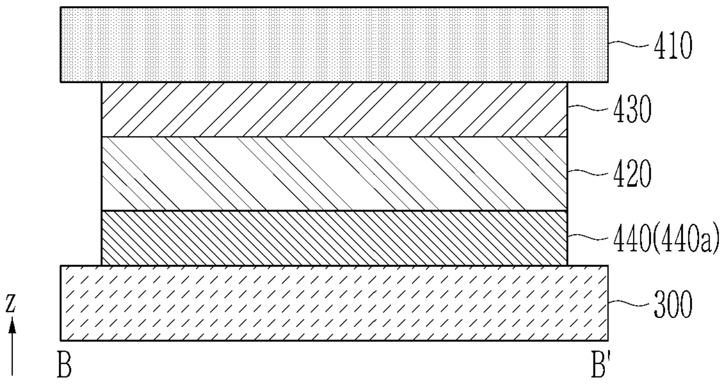
FIG. 9 illustrates a schematic view showing a cross-section taken along line B-B' in FIG. 7.
Figure 10:
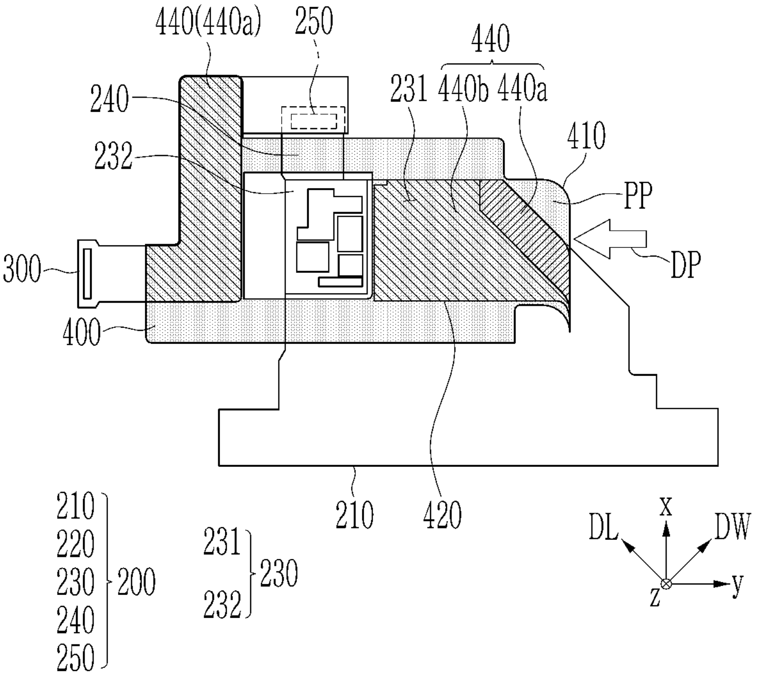
FIG. 10 illustrates a process of peeling a protective film from a flexible printed circuit board.

FIG. 7 illustrates a state in which a flexible printed circuit board and a protective film are separated from the display device illustrated in FIG. 5, FIG. 8 illustrates a schematic view showing a cross-section taken along line A-A' in FIG. 7, and FIG. 9 illustrates a schematic view showing a cross-section taken along line B-B' in FIG. 7. FIG. 10 illustrates a process of peeling a protective film from a flexible printed circuit board.

Referring to FIG. 7 to FIG. 10, the protective film 400 may include a cover layer 410, a support layer 420, a first adhesive layer 430, and a second adhesive layer 440.

The cover layer 410 may be exposed to an outer side of the protective film 400. The cover layer 410 may define an overall planar shape of the protective film 400. The cover layer 410 may include portions overlapping the first and second flexible printed circuit boards 200 and 300 in a thickness direction z; the cover layer 410 also may include portions not overlapping the first flexible printed circuit board 200 nor the second flexible printed circuit board 300 in the thickness direction z. The cover layer 410 may not overlap the component region 232 of the body 230. In FIG. 7, a gray shaded region may correspond to the cover layer 410. The cover layer 410 may completely cover the support layer 420.

The support layer 420 may provide rigidity and support to the first and second flexible printed circuit boards 200 and 300 to prevent the first and second flexible printed circuit boards 200 and 300 from being wound or rolled. As illustrated in FIG. 8, the support layer 420 may be positioned between the cover layer 410 and the first flexible printed circuit board 200; as illustrated in FIG. 9, the support layer 420 may be positioned between the cover layer 410 and the second flexible printed circuit board 300. Hence, the support layer 420 may be positioned to overlap the first and second flexible printed circuit boards 200 and 300 in a thickness direction z. The support layer 420 may be attached to the wire region 231 of the body 230 of the first flexible printed circuit board 200. The support layer 420 may be attached to the wire region 231 of the first flexible printed circuit board 200. In FIG. 7, a hatched region is a region in which the support layer 420 is disposed. A portion of the support layer 420 attached to the first flexible printed circuit board 200 and a portion of the support layer 420 attached to the second flexible printed circuit board 300 may be separated from each other. The portion of the support layer 420 attached to the first flexible printed circuit board 200 may be positioned at an upper end of the body portion 230. The portion of the support layer 420 attached to the second flexible printed circuit board 300 may extend long along the wire region of the second flexible printed circuit board 300.

The first adhesive layer 430 may be positioned between the cover layer 410 and the support layer 420 to attach the cover layer 410 and the support layer 420. The first adhesive layer 430 may have substantially a same planar shape as that of the support layer 420. In case that the protective film 400 is peeled off, all the layers 410, 420, 430, and 440 of the protective film 400 may be removed at once. In case that the protective film 400 is peeled off, the first adhesive layer 430 may attach the cover layer 410 and the support layer 420 with a strong adhesive force such that the cover layer 410 is not separated from the support layer 420. For example, an adhesive force of the first adhesive layer 430 may be about 2500 gf/25 mm or more.

The second adhesive layer 440 may be disposed between the support layer 420 and the first and second flexible printed circuit boards 200 and 300, causing attachment of the support layer 420 to the first and second flexible printed circuit boards 200 and 300. Accordingly, the protective film 400 may be attached to the first and second flexible printed circuit boards 200 and 300 by the second adhesive layer 440. The second adhesive layer 440 may have substantially a same planar shape as that of the support layer 420. In case that the protective film 400 is removed, the second adhesive layer 440 may attach the support layer 420 and the first and second flexible printed circuit boards 200 and 300 with a weak adhesive force such that the support layer 420 can be separated from the first and second flexible printed circuit boards 200 and 300. For example, an adhesive force of the second adhesive layer 440 may be about 500 gf/25 mm or less, about 450 gf/25 mm or less, or about 400 gf/25 mm or less.

The second adhesive layer 440 may include a first adhesive portion 440*a* and a second adhesive portion 440*b* having different adhesive forces. An adhesive force of the first adhesive portion 440*a* may be greater than that of the second adhesive portion 440*b*. The adhesive force of the first adhesive portion 440*a* may be about 350 gf/25 mm to about 450 gf/25 mm. The adhesive force of the second adhesive portion 440*b* may be about 150 gf/25 mm to about 250 gf/25 mm. For example, the adhesive force of the first adhesive portion 440*a* may be about 400 gf/25 mm, and the adhesive force of the second adhesive portion 440*b* may be about 200 gf/25 mm. An area of the second adhesive portion 440*b* may be larger than a corresponding area of the first adhesive portion 440*a*.

The first adhesive portion 440*a* may be positioned closer to a position PP of FIG. 10 (where peeling of the protective film 400 starts) than the second adhesive portion 440*b*. For example, the protective film 400 may be peeled off in a direction opposite to the second direction y (e.g., a block arrow direction DP in FIG. 10), and a right edge portion of the second adhesive layer 440 may be the first adhesive portion 440*a*. The first adhesive portion 440*a* may prevent the protective film 400 from lifting by attaching the support layer 420 to the body 230 of the first flexible printed circuit board 200 with a relatively strong adhesive force. The second adhesive portion 440*b* attaches the support layer 420 to the body 230 of the first flexible printed circuit board 200 with a relatively weak adhesive force, and thus in case that the protective film 400 is peeled off, after the first adhesive portion 440*a* has been peeled off, the second adhesive portion 440*b* may be easily peeled off, thereby preventing damage to the body 230.

In case that the second adhesive layer 440 is formed to have a uniform adhesive force as a whole, it may be difficult to provide an appropriate adhesive force. For example, in case that the adhesive force of the second adhesive layer 440 is weak, the protective film 400 may be lifted, and thus a risk of interference in a pre-shipment process may increase. In case that the adhesive force of the second adhesive layer 440 is strong, peeling of the protective film 400 may become difficult, thereby increasing a tact time, and in case that the protective film 400 is peeled off, the first flexible printed circuit board 200 may be torn. As in an embodiment, by differentially applying the adhesive force of the second adhesive layer 440 depending on an attachment area, lifting of the protective film 400 may be prevented and the protective film 400 may be readily removed.

The first adhesive portion 440*a* may be positioned to extend in a diagonal direction DL with respect to a peeling direction DP of the protective film 400. The first adhesive portion 440*a* may have a length in a diagonal direction DL with respect to the peeling direction DP and a width in a second direction DW that is perpendicular to and crossing the diagonal direction DL, and may have a planar shape in which the length is greater than the width. The first adhesive portion 440*a* may have a relatively strong adhesive force that may cause a difficulty in peeling the protective film in a case that the first adhesive portion 440*a* is positioned to extend substantially at a right angle to the peeling direction DP of the protective film 400 and a length of pre-adhesion in a separation direction is relatively long. In contrast, it may be relatively easier to peel the protective film 400 in case that the first adhesive portion 440*a* is positioned to extend substantially in a direction parallel to the peeling direction of the protective film 400, where an edge of the protective film 400 on which the first adhesive portion 440*a* is not positioned may be lifted. Accordingly, positioning the first adhesive portion 440*a* in an oblique direction DL with respect to the peeling direction DP of the protective film 400 may prevent lifting of the protective film 400 and facilitate peeling of the protective film 400.

The second adhesive layer 440 positioned between the support layer 420 and the second flexible printed circuit board 300 may include the first adhesive portion 440*a* having a relatively strong adhesive force. For example, the first adhesive portion 440*a* of the second adhesive layer 440, that may be arranged to attach the support layer 420 to the second flexible printed circuit board 300, may have an adhesive force of about 350 gf/25 mm to about 450 gf/25 mm. The second flexible printed circuit board 300 may be separated from the first flexible printed circuit board 200 after the display device 30 is inspected, and thus in case that the protective film 400 is removed, it is not necessary to peel the protective film 400 from the second flexible printed circuit board 300, and the second flexible printed circuit board 300 may be removed together with the protective film 400. For example, the protective film 400 and the second flexible printed circuit board 300 may be removed together by separating the connector of the second flexible printed circuit board 300 from the connector 250 of the first flexible printed circuit board 200 after the protective film 400 is peeled off from the first flexible printed circuit board 200 in the peeling direction. Accordingly, the support layer 420 and the second flexible printed circuit board 300 do not require easy detachment during the process, and it may be advantageous to use the first adhesive portion 440*a* having a relatively strong adhesive force in order to prevent lifting of the protective film 400.

Each of the cover layer 410 and the support layer 420 may include a polymer resin such as polyethylene terephthalate, polyethylene naphthalate, polyether sulfone, polyimide, polyarylate, polycarbonate, polyurethane, polyolefin, polyacrylate, tri-acetyl-cellulose, polypropylene, and polyester, or a combination thereof. For example, the cover layer 410 and the support layer 420 may each be a single-layer film including polyethylene terephthalate.

The first adhesive layer 430 and the second adhesive layer 440 may include an organic adhesive such as a pressure sensitive adhesive or an optically clear adhesive. The organic adhesive layer may include an adhesive material such as a polyurethane-based, polyacryl-based, polyester-based, polyepoxy-based, or polyvinyl acetate-based adhesive material, or a combination thereof.

Figure 11:
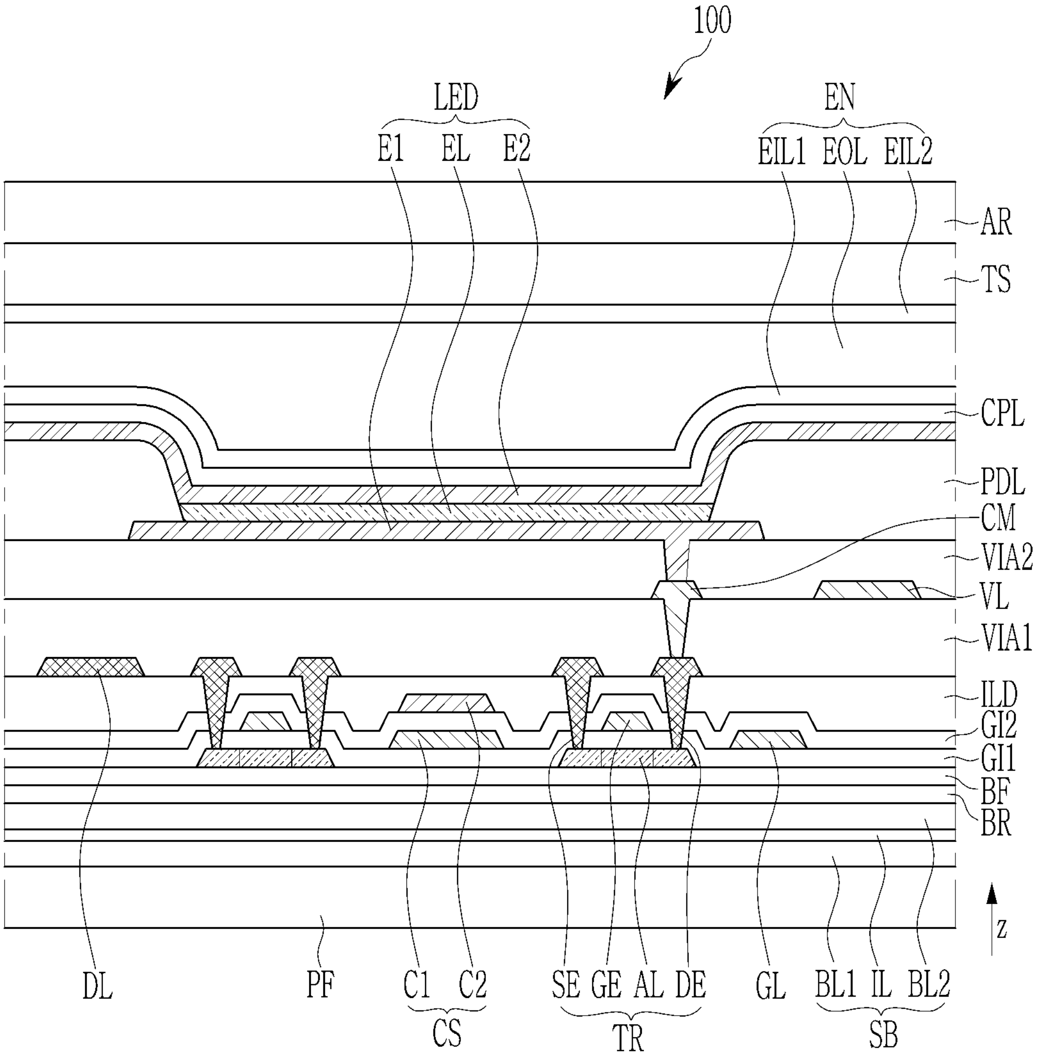
FIG. 11 illustrates a schematic cross-sectional view of a display panel according to an embodiment.

FIG. 11 illustrates a schematic cross-sectional view of a display panel according to an embodiment.

The cross-section illustrated in FIG. 11 may correspond to approximately one pixel. The display panel 100 basically includes a substrate SB, a transistor TR formed on the substrate SB, and a light emitting diode LED electrically connected to the transistor TR. The light emitting diode LED may correspond to the pixel.

The substrate SB may be a flexible substrate SB capable of bending, folding, rolling, or the like. The substrate SB may be a multilayer including a first base layer BL1, an inorganic layer IL, and a second base layer BL2. The first base layer BL1 and the second base layer BL2 may each include a polymer resin such as polyimide, polyamide, or polyethylene terephthalate. A barrier layer BR that prevents moisture and oxygen from penetrating the substrate SB may be disposed. The buffer layer BR may include an inorganic insulating material such as a silicon nitride ($SiN_x$), a silicon oxide ($SiO_x$), or a silicon oxynitride ($SiO_xN_y$), or a combination thereof, and may be a single layer or multiple layers.

A buffer layer BF may be disposed on the barrier layer BR. The buffer layer BF may improve a characteristic of the semiconductor layer by blocking impurities from the substrate SB as the semiconductor layer is formed, and may flatten a surface of the substrate SB to relieve a stress of the semiconductor layer. The buffer layer BF may include an inorganic insulating material such as a silicon nitride, a silicon oxide, and a silicon oxynitride, or a combination thereof, and may be a single layer or multiple layers. The buffer layer BF may include amorphous silicon (a-Si).

A semiconductor layer AL of a transistor TR may be disposed on the buffer layer BF. The semiconductor layer AL may include a first region and a second region, and a channel region therebetween. The semiconductor layer AL may include any one of amorphous silicon, polysilicon, an oxide semiconductor, or a combination thereof. The oxide semiconductor may include at least one of zinc (Zn), indium (In), gallium (Ga), or tin (Sn), or a combination thereof. For example, the semiconductor layer AL may include low-temperature polycrystalline silicon (LTPS) or an indium-gallium-zinc oxide (IGZO).

A first gate insulating layer GI1 may be disposed on the semiconductor layer AL. The first gate insulating layer GI1 may include an inorganic insulating material such as a silicon nitride, a silicon oxide, and a silicon oxynitride, and may be a single layer or multiple layers.

The first gate conductive layer, which may include a gate electrode GE of the transistor TR, a gate line GL, and a first electrode C1 of a storage capacitor CS, may be disposed on the first gate insulating layer GI1. The first gate conductive layer may include molybdenum (Mo), aluminum (Al), copper (Cu), titanium (Ti), and the like, or a combination thereof, and may be a single layer or multiple layers.

A second gate insulating layer GI2 may be disposed on the first gate conductive layer. The second gate insulating layer GI2 may include an inorganic insulating material such as a silicon nitride, a silicon oxide, and a silicon oxynitride, or a combination thereof, and may be a single layer or multiple layers.

A second gate conductive layer that may include a second electrode C2 of the storage capacitor CS and the like may be disposed on the second gate insulating layer GI2. The second gate conductive layer may include molybdenum (Mo), aluminum (Al), copper (Cu), titanium (Ti), and the like, or a combination thereof, and may be a single layer or multiple layers.

An interlayer insulating layer ILD may be disposed on the second gate insulating layer GI2 and the second gate conductive layer. The interlayer insulating layer ILD may include an inorganic insulating material such as a silicon nitride, a silicon oxide, or a silicon oxynitride, or a combination thereof, and may be a single layer or multiple layers.

A first data conductive layer that may include a first electrode SE and a second electrode DE, a data line DL, and the like of the transistor TR may be disposed on the interlayer insulating layer ILD. The first electrode SE and the second electrode DE may be respectively electrically connected to a first region and a second region of the semiconductor layer AL through contact holes of the insulating layers GI1, GI2, and ILD. One of the first electrode SE and the second electrode DE may serve as a source electrode, and the other may serve as a drain electrode. The first data conductive layer may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), copper (Cu), and the like, or a combination thereof, and may be a single layer or multiple layers.

A first planarization layer VIA1 may be disposed on the first data conductive layer. The first planarization layer VIA1 may contain a general purpose polymer such as a polymer derivative having a phenolic group, an acrylic polymer, an imide-based polymer (e.g., a polyimide), and an organic insulating material such as a siloxane-based polymer.

A second data conductive layer, which may include a voltage line VL, a connecting member CM, and the like, may be disposed on the first planarization layer VIA1. The voltage line VL may transfer voltages such as a driving voltage, a common voltage, an initialization voltage, and a reference voltage. The connecting member CM may be electrically connected to the second electrode DE of the transistor TR through a contact hole of the first planarization layer VIAL The second data conductive layer may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), copper (Cu), and the like, or a combination thereof, and may be a single layer or multiple layers.

A second planarization layer VIA2 may be disposed on the second data conductive layer. The second planarization layer VIA2 may contain an organic insulating material such as a general purpose polymer such as poly(methyl methacrylate) or styrene, a polymer derivative having a phenolic group, an acrylic polymer, an imide-based polymer, and a siloxane-based polymer.

A first electrode E1 of the light emitting diode LED may be disposed on the second planarization layer VIA2. The first electrode E1 may be referred to as a pixel electrode. The first electrode E1 may be electrically connected to the connecting member CM through a contact hole formed in the second planarization layer VIA2. Accordingly, the first electrode E1 may be electrically connected to the second electrode DE of the transistor TR to receive a driving current for controlling luminance of the light emitting diode LED. The transistor TR to which the first electrode E1 is electrically connected may be a driving transistor or a transistor that is electrically connected to the driving transistor. The first electrode E1 may be formed of a reflective conductive material or a translucent conductive material, or may be formed of a transparent conductive material. The first electrode E1 may include a transparent conductive material such as an indium tin oxide (ITO) or an indium zinc oxide (IZO). The first electrode E1 may include lithium (Li), calcium (Ca), aluminum (Al), silver (Ag), magnesium (Mg), or gold (Au), or a combination thereof.

A pixel defining layer PDL may be positioned on the second planarization layer VIA2 and the first electrode E1. The pixel defining layer PDL may be referred to as a bank or a partition wall, and may have an opening overlapping the first electrode E1 in the thickness direction z. The pixel defining layer PDL may include an organic insulating material, e.g., a general purpose polymer such as poly(methyl methacrylate) or polystyrene, a polymer derivative having a phenolic group, an acrylic polymer, an imide-based polymer, or a siloxane-based polymer, or a combination thereof.

An emission layer EL of the light emitting diode LED may be disposed on the first electrode E1. In addition to the emission layer EL, a functional layer including at least one of a hole injection layer, a hole transport layer, an electron transport layer, and an electron injection layer may be disposed on the first electrode E1.

A second electrode E2 of the light emitting diode LED is disposed on the emission layer EL. The second electrode E2 may be referred to as a common electrode. The second electrode E2 may be made of a low work function metal such as calcium (Ca), barium (Ba), magnesium (Mg), aluminum (Al), silver (Ag), or a metal alloy, as a thin layer to have light transmittance. The second electrode E2 may include a transparent conductive oxide such as an indium tin oxide (ITO) or an indium zinc oxide (IZO), or a combination thereof.

The first electrode E1, the emission layer EL, and the second electrode E2 of each pixel may constitute a light emitting diode LED, such as an organic light emitting diode. The first electrode E1 may serve as an anode, and the second electrode E2 may serve as a cathode. An emission region of the light emitting diode LED may correspond to a pixel.

A capping layer CPL may be disposed on the second electrode E2. The capping CPL may improve light efficiency by adjusting a refractive index. The capping layer CPL may be disposed to entirely cover the second electrode E2. The capping layer CPL may include an organic insulating material, or may include an inorganic insulating material.

An encapsulation layer EN may be disposed on the capping layer CPL. The encapsulation layer EN may encapsulate a light emitting diode LED to prevent moisture or oxygen from penetrating from the outside. The encapsulation layer EN may be a thin film encapsulation layer in which the organic layer EOL is positioned between the first inorganic layer EIL1 and the second inorganic layer EIL2.

A touch sensor layer TS including touch electrodes may be disposed on the encapsulation layer EN. An anti-reflection layer AR for reducing external light reflection may be disposed on the touch sensor layer TS.

A passivation layer PF may be positioned under the substrate SB. The passivation layer PF may protect the display panel 100 in a manufacturing process of a display device or the like. The passivation layer PF may include a polymer such as polyethylene terephthalate, a silicone-based polymer (e.g., polydimethylsiloxane), or an elastomer (e.g., elastomeric polyurethane), or a combination thereof, and may be in the form of a film.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
a display panel;
a first flexible printed circuit board electrically connected to the display panel; and
a protective film attached to the first flexible printed circuit board,
wherein the first flexible printed circuit board is disposed between the display panel and the protective film, and
wherein the protective film includes:
a cover layer;
a support layer disposed between the cover layer and the first flexible printed circuit board;
a first adhesive layer attaching the cover layer and the support layer; and
a second adhesive layer attaching the support layer to the first flexible printed circuit board and including a first adhesive portion and a second adhesive portion, the first and second adhesive portions having different respective adhesive forces.

2. The display device of claim 1, wherein
the adhesive force of the first adhesive portion is greater than the corresponding adhesive force of the second adhesive portion, and the second adhesive portion has a larger area than a corresponding area of the first adhesive portion.

3. The display device of claim 2, wherein
the first adhesive portion extends in a diagonal direction with respect to a peeling direction of the protective film.

4. The display device of claim 2, wherein
the first adhesive portion is disposed closer to a position, where peeling of the protective film starts, than the second adhesive portion.

5. The display device of claim 1, wherein
the adhesive force of the first adhesive portion is about 350 gf/25 mm to about 450 gf/25 mm, and the adhesive force of the second adhesive portion is about 150 gf/25 mm to about 250 gf/25 mm.

6. The display device of claim 5, wherein
the adhesive force of the first adhesive layer is about 2500 gf/25 mm or more.

7. The display device of claim 1, wherein
the first flexible printed circuit board includes:
a compression portion bonded to the display panel;
a bending portion that is bent while surrounding an edge of the display panel; and
a body including a wire region in which a wire is disposed and a component region in which a component is disposed, and
the support layer is attached to the wire region.

8. The display device of claim 7, wherein
the protective film does not cover the component region.

9. The display device of claim 1, wherein
the support layer, the first adhesive layer, and the second adhesive layer have a same planar shape, and
the cover layer completely covers the support layer.

10. The display device of claim 1, further comprising:
a second flexible printed circuit board electrically connected to the first flexible printed circuit board,
wherein the protective film is attached to the second flexible printed circuit board.

11. The display device of claim 10, wherein
an adhesive force of a portion of the second adhesive layer attaching the support layer to the second flexible printed circuit board is about 350 gf/25 mm to about 450 gf/25 mm.

12. The display device of claim 10, wherein the cover layer includes a portion that does not overlap the first flexible printed circuit board and the second flexible printed circuit board in a plan view, and the support layer does not include a portion that does not overlap the first flexible printed circuit board and the second flexible printed circuit board in a plan view.

13. The display device of claim 1, wherein the display panel includes a first flat area, a second flat area, and a bending area between the first flat area and the second flat area, and the first flexible printed circuit board is not disposed on a rear surface of the first flat area.

14. The display device of claim 1, wherein at least one of the cover layer and the support layer is a single-layer film including polyethylene terephthalate.

15. A display device comprising:

a display panel;

a first flexible printed circuit board electrically connected to the display panel;

a second flexible printed circuit board electrically connected to the first flexible printed circuit board; and a protective film attached to the first flexible printed circuit board and the second flexible printed circuit board, wherein the first flexible printed circuit board is disposed between the display panel and the protective film, and wherein the protective film includes:

a cover layer defining a planar shape of the protective film;

a support layer disposed between the cover layer and the first flexible printed circuit board, and further disposed between the cover layer and the second flexible printed circuit board;

a first adhesive layer attaching the cover layer and the support layer; and a second adhesive layer attaching the support layer to the first flexible printed circuit board and the second flexible printed circuit board and including first and second adhesive portions, the first and second adhesive portions having different respective adhesive forces.

16. The display device of claim 15, wherein the adhesive force of the first adhesive portion is greater than the corresponding adhesive force of the second adhesive portion, and the second adhesive portion has a larger area than a corresponding area of the first adhesive portion.

17. The display device of claim 16, wherein the first adhesive portion extends in a diagonal direction with respect to a peeling direction of the protective film.

18. The display device of claim 15, wherein the adhesive force of the first adhesive portion is about 350 gf/25 mm to about 450 gf/25 mm, and the adhesive force of the second adhesive portion is about 150 gf/25 mm to about 250 gf/25 mm.

19. The display device of claim 15, wherein the first flexible printed circuit board includes:

a compression portion bonded to the display panel;

a bending portion that is bent while surrounding an edge of the display panel; and a body including a wire region in which a wire is disposed and a component region in which a component is disposed, and the support layer is attached to the wire region.

20. The display device of claim 15, wherein the support layer, the first adhesive layer, and the second adhesive layer have a same planar shape, and the cover layer completely covers the support layer.

* * * * *